United States Patent
Gibson et al.

(10) Patent No.: US 11,842,450 B2
(45) Date of Patent: *Dec. 12, 2023

(54) VEHICULAR BACKING UP ASSISTANCE SYSTEM

(71) Applicant: MAGNA ELECTRONICS INC., Auburn Hills, MI (US)

(72) Inventors: Joel S. Gibson, Linden, MI (US); Steven V. Byrne, Goodrich, MI (US); Richard D. Shriner, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 508 days.

This patent is subject to a terminal disclaimer.

(21) Appl. No.: 17/301,004

(22) Filed: Mar. 22, 2021

(65) Prior Publication Data

US 2021/0209861 A1   Jul. 8, 2021

Related U.S. Application Data

(63) Continuation of application No. 16/786,094, filed on Feb. 10, 2020, now Pat. No. 10,957,114, which is a
(Continued)

(51) Int. Cl.
*H04N 17/02* (2006.01)
*G06T 19/00* (2011.01)
(Continued)

(52) U.S. Cl.
CPC .............. *G06T 19/006* (2013.01); *B60R 1/00* (2013.01); *H04N 17/002* (2013.01); *B60R 2300/305* (2013.01); *B60R 2300/806* (2013.01)

(58) Field of Classification Search
CPC ... G06T 19/006; B60R 1/00; B60R 2300/305; B60R 2300/806; H04N 17/002
See application file for complete search history.

(56) References Cited

U.S. PATENT DOCUMENTS 5,289,321 A   2/1994 Secor
5,359,363 A   10/1994 Kuban et al.
(Continued)

FOREIGN PATENT DOCUMENTS

JP   59114139   7/1984
JP   05133336   9/1984
(Continued)

OTHER PUBLICATIONS

Ballard, Dana H. et al., "Computer Vision", 1982, p. 88-89, sect. 3.4.1.
(Continued)

*Primary Examiner* — Timothy R Newlin
(74) *Attorney, Agent, or Firm* — HONIGMAN LLP

(57) ABSTRACT

A vehicular backing up assistance system includes a rearview camera at a rear portion of a vehicle, the vehicle being a vehicle family member of a particular family of pickup trucks. The system receives first input data that corresponds to the vehicle configuration of the vehicle. When the vehicle is backing up, the system receives second input data corresponding to steering angle of the vehicle. The system displays a predicted trajectory of the vehicle at the in-cabin display as an overlay overlaying the images captured by the rearview camera being displayed at the in-cabin display. The overlay comprises a pair of guidelines that are spaced apart and that are appropriate to (i) the wheelbase of the vehicle configuration of a plurality of vehicle configurations of the particular family of pickup trucks the rearview camera is mounted at and (ii) a current steering angle of the vehicle.

88 Claims, 6 Drawing Sheets

Related U.S. Application Data continuation of application No. 16/234,760, filed on Dec. 28, 2018, now Pat. No. 10,559,134, which is a continuation of application No. 16/029,750, filed on Jul. 9, 2018, now Pat. No. 10,169,926, which is a continuation of application No. 14/117,759, filed as application No. PCT/US2011/036967 on May 18, 2011, now Pat. No. 10,019,841.

(51) Int. Cl.
*B60R 1/00* (2022.01)
*H04N 17/00* (2006.01)

(56) References Cited

U.S. PATENT DOCUMENTS

| | | | |
|---|---|---|---|
| 5,410,346 | A | 4/1995 | Saneyoshi et al. |
| 5,414,461 | A | 5/1995 | Kishi et al. |
| 5,444,478 | A | 8/1995 | Lelong et al. |
| 5,574,443 | A | 11/1996 | Hsieh |
| 5,793,308 | A | 8/1998 | Rosinski et al. |
| 5,949,331 | A | 9/1999 | Schofield et al. |
| 6,155,377 | A | 12/2000 | Tokunaga et al. |
| 6,256,561 | B1 | 7/2001 | Asanuma |
| 6,578,017 | B1 | 6/2003 | Ebersole et al. |
| 6,631,994 | B2 | 10/2003 | Suzuki et al. |
| 7,295,227 | B1 | 11/2007 | Asahi et al. |
| 7,843,451 | B2 | 11/2010 | Lafon |
| 7,930,160 | B1 | 4/2011 | Hosagrahara et al. |
| 8,405,724 | B2 | 3/2013 | Jeon et al. |
| 8,451,107 | B2 | 5/2013 | Lu et al. |
| 10,019,841 | B2 | 7/2018 | Gibson et al. |
| 10,169,926 | B2 | 1/2019 | Gibson et al. |
| 10,559,134 | B2 | 2/2020 | Gibson et al. |
| 10,957,114 | B2 | 3/2021 | Gibson et al. |
| 2002/0120371 | A1 | 8/2002 | Leivian et al. |
| 2002/0128754 | A1 | 9/2002 | Sakiyama et al. |
| 2006/0287826 | A1 | 12/2006 | Shimizu et al. |
| 2007/0038422 | A1 | 2/2007 | Wang et al. |
| 2007/0120657 | A1 | 5/2007 | Schofield et al. |
| 2007/0194899 | A1 | 8/2007 | Lipman |
| 2008/0077882 | A1* | 3/2008 | Kramer .............. G01C 21/3644 715/810 |
| 2008/0129539 | A1 | 6/2008 | Kumon |
| 2008/0231701 | A1 | 9/2008 | Greenwood et al. |
| 2008/0266541 | A1 | 10/2008 | Yung et al. |
| 2008/0300745 | A1 | 12/2008 | Goossen et al. |
| 2009/0079828 | A1* | 3/2009 | Lee ..................... B60R 1/00 348/148 |
| 2009/0096937 | A1* | 4/2009 | Bauer ................. B60R 1/12 348/739 |
| 2009/0179916 | A1 | 7/2009 | Williams et al. |
| 2012/0316779 | A1 | 12/2012 | Kanno et al. |
| 2014/0032184 | A1 | 1/2014 | Carrasco et al. |
| 2014/0290468 | A1* | 10/2014 | Arnold ................ H03G 5/025 84/736 |
| 2020/0134396 | A1* | 4/2020 | Porta ................... G05D 1/0257 |

FOREIGN PATENT DOCUMENTS

| | | |
|---|---|---|
| JP | 6080953 | 5/1985 |
| JP | 6079889 | 10/1986 |
| JP | 6272245 | 5/1987 |
| JP | 62122487 | 6/1987 |
| JP | 6414700 | 1/1989 |
| JP | 04114587 | 4/1992 |
| JP | 0550883 | 3/1993 |
| JP | 0577657 | 3/1993 |
| JP | 5213113 | 8/1993 |
| JP | 06227318 | 8/1994 |
| JP | 074170 | 1/1995 |
| JP | 07105496 | 4/1995 |
| JP | 2630604 | 7/1997 |

OTHER PUBLICATIONS

International Search Report and Written Opinion dated Sep. 9, 2011 for PCT Application No. PCT/US2011/036967.
Tokumaru et al., "Car Rear-View TV System with CCD Camera," National Technical Report vol. 34, No. 3, pp. 329-336, Jun. 1988 (Japan).
Wang et al., CMOS Video Cameras, article, 1991, 4 pages, University of Edinburgh, UK.
"Edmunds", combined screen shots from http://www.edmunds.com/bmw/5-series/2010/features-specs.html?sub=sedan&style=101166700 (last visited Apr. 20, 2015) and http:/web.archive.org/web/20110223063738/http://www.edmunds.com/bmw/5-series/2010/features-specs.html (last visited Apr. 20, 2015) (Edmunds last saved Feb. 23, 2011).
Kannan, Saravanan et al., "An Intelligent Driver Assistance System (I-DAS) for Vehicle Safety Modelling Using Ontology Approach." International Journal of Ubicomp (IJU) vol. 1, No. 3 (Jul. 2010), pp. 15-29.

* cited by examiner

FIG. 6 — 32

| OVERLAY MAP COUNT | WHEEL BASE (inch) STEERING GEAR OVERLAY RADIUS (mm) | 11a 100" 36a 1 SWA SWITCH (deg) | 11b 110" 36a 1 SWA SWITCH (deg) | 11c 120" 36a 1 SWA SWITCH (deg) | 11d 130" 36a 1 SWA SWITCH (deg) | 11c 120" 36b 2 SWA SWITCH (deg) | 11d 130" 36b 2 SWA SWITCH (deg) | 11e 140" 36b 2 SWA SWITCH (deg) |
|---|---|---|---|---|---|---|---|---|
| 22-1 | 42500 | 30 | 40 | 40 | 40 | 30 | 40 | 40 |
| 22-2 | 22500 | 110 | 120 | 130 | 140 | 110 | 120 | 120 |
| 22-3 | 15800 | 180 | 190 | 210 | 220 | 180 | 190 | 200 |
| 22-4 | 12400 | 240 | 250 | 270 | 300 | 240 | 260 | 270 |
| 22-5 | 10400 | 300 | 320 | 340 | 370 | 300 | 320 | 340 |
| 22-6 | 9000 | 360 | 380 | 410 | 430 | 350 | 380 | 390 |
| 22-7 | 8100 | 410 | 430 | 460 | 490 | 400 | 420 | 440 |
| 22-8 | 7400 | 450 | 470 | 500 | 540 | 440 | 470 | 490 |
| 22-9 | 6800 | 490 | 510 | 550 | 590 | 480 | 520 | 530 |
| 22-10 | 6400 | 530 | 550 | 600 | 640 | 520 | 550 | 570 |
| 22-11 | 6000 | 570 | 600 | 630 | 670 | 550 | 580 | 590 |
| 22-12 | 5700 | 600 | 630 | 660 | 690 | 570 | 600 | |
| 22-13 | 5400 | 630 | 650 | 680 | | 590 | | |
| 22-14 | 5200 | 650 | 670 | | | | | |
| 22-15 | 5100 | 670 | 690 | | | | | |
| 22-16 | 4900 | 690 | | | | | | |
| 22-17 | 4800 | 700 | | | | | | |

VEHICULAR BACKING UP ASSISTANCE SYSTEM

CROSS REFERENCE TO RELATED APPLICATIONS

The present application is a continuation of U.S. patent application Ser. No. 16/786,094, filed Feb. 10, 2020, now U.S. Pat. No. 10,957,114, which is a continuation of U.S. patent application Ser. No. 16/234,760, filed Dec. 28, 2018, now U.S. Pat. No. 10,559,134, which is a continuation of U.S. patent application Ser. No. 16/029,750, filed Jul. 9, 2018, now U.S. Pat. No. 10,169,926, which is a continuation of U.S. patent application Ser. No. 14/117,759, filed Nov. 14, 2013, now U.S. Pat. No. 10,019,841, which is a 371 national phase filing of PCT Application No. PCT/US2011/036967, filed May 18, 2011.

FIELD OF THE INVENTION

The present invention relates to vehicular cameras and more particularly to rearview vehicular cameras that display overlays onto the camera image.

BACKGROUND OF THE INVENTION

Vehicular cameras are used for a variety of purposes, such as to assist a driver in avoiding obstacles behind a vehicle when backing up. Some cameras add overlays onto the camera image to assist the driver in determining distances to obstacles behind the vehicle, vehicle trajectory and other useful information. The overlays may be static or may be dynamic. A dynamic overlay is an overlay that is changed by the camera based on certain inputs. For example, some cameras display a predicted vehicle trajectory based on certain factors such as steering wheel angle. The overlays, whether static or dynamic, will change depending on the angle of mounting of the camera, the height of the camera off the ground, distance from the camera horizontally to the rear axle of the vehicle, the steering gear ratio for the vehicle, and possibly other factors. As a result, cameras for different vehicles up until now have had different programming and thus have different part numbers associated with them. This results in a potentially large number of part numbers and inventory. A particular vehicle family, such as a particular truck, may have numerous vehicle configurations that will impact the overlays that are displayed by the rearview camera. Such configurations would include, for example, regular cab with short bed, regular cab with long bed, extended cab with short bed and extended cab with long bed.

It would be desirable to reduce the number of separate part numbers that are associated with variations on programming for essentially the same camera.

SUMMARY OF THE INVENTION

In one aspect, the invention is directed to a vehicular camera including a housing, a lens, an image sensor positioned for receiving images from the lens, a processor, and a memory. The memory contains a plurality of overlays. The processor is programmed to receive first input data from a vehicle in which the camera is to be mounted, wherein the first input data correspond to the configuration of the vehicle, and select a particular overlay to display based at least in part on the input received.

BRIEF DESCRIPTION OF THE DRAWINGS

The present invention will now be described by way of example only with reference to the attached drawings in which:

FIG. 6 is another lookup table that is used by an enhanced version of the camera to determine which overlay to use on an image.

DETAILED DESCRIPTION OF THE INVENTION

Figure 1:
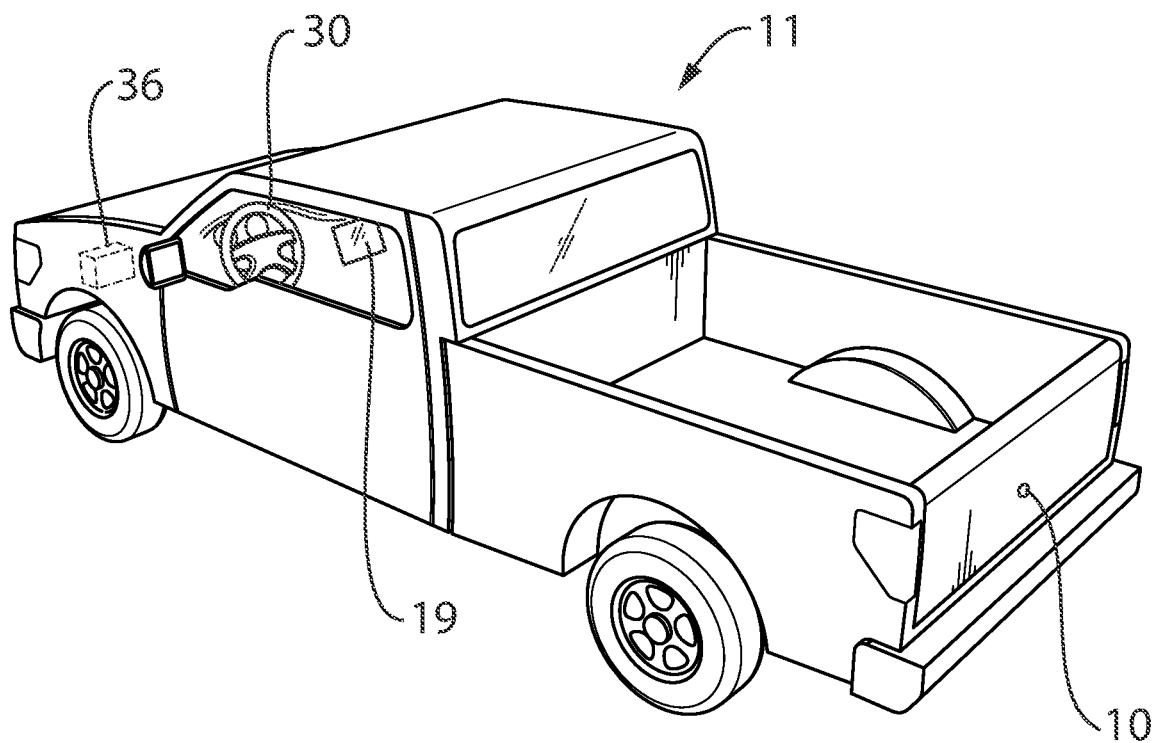
FIG. 1 is a perspective view of a vehicle with a vehicular camera in accordance with an embodiment of the present invention.
Figure 2:
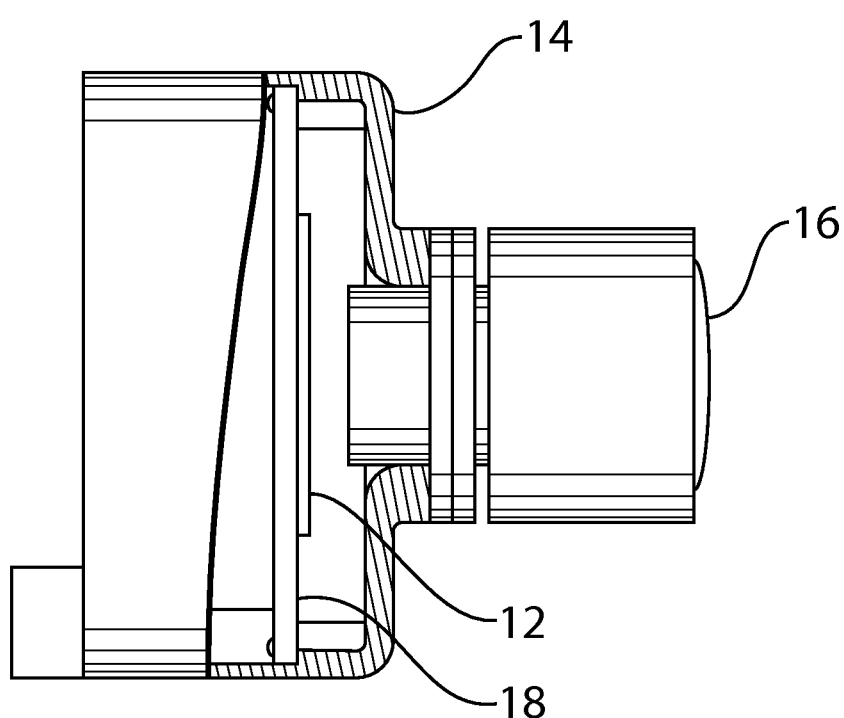
FIG. 2 is a cutaway side view of the vehicular camera shown in FIG. 1.
Figure 3:
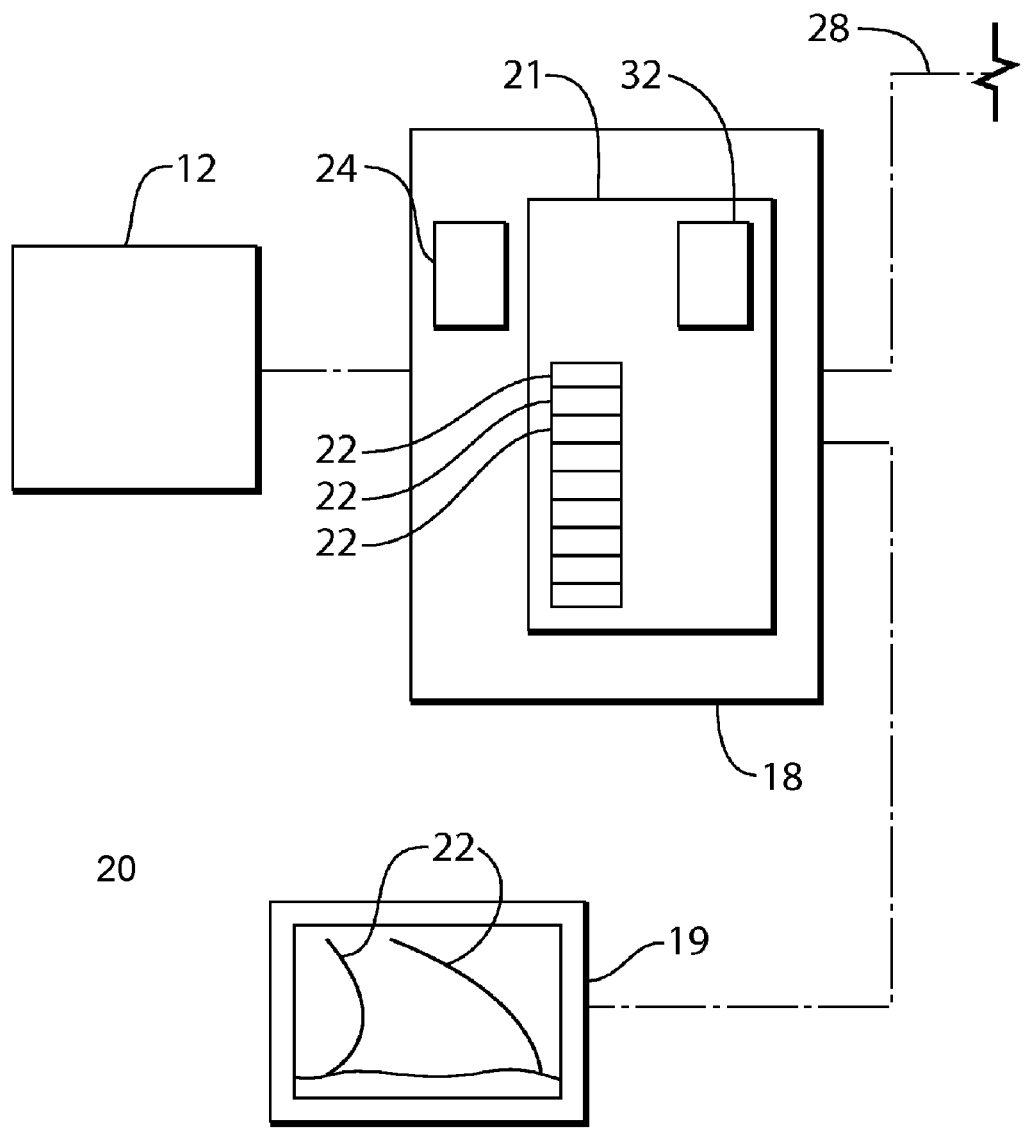
FIG. 3 is a schematic illustration of selected components from the camera shown in FIG. 1.
Figure 4:
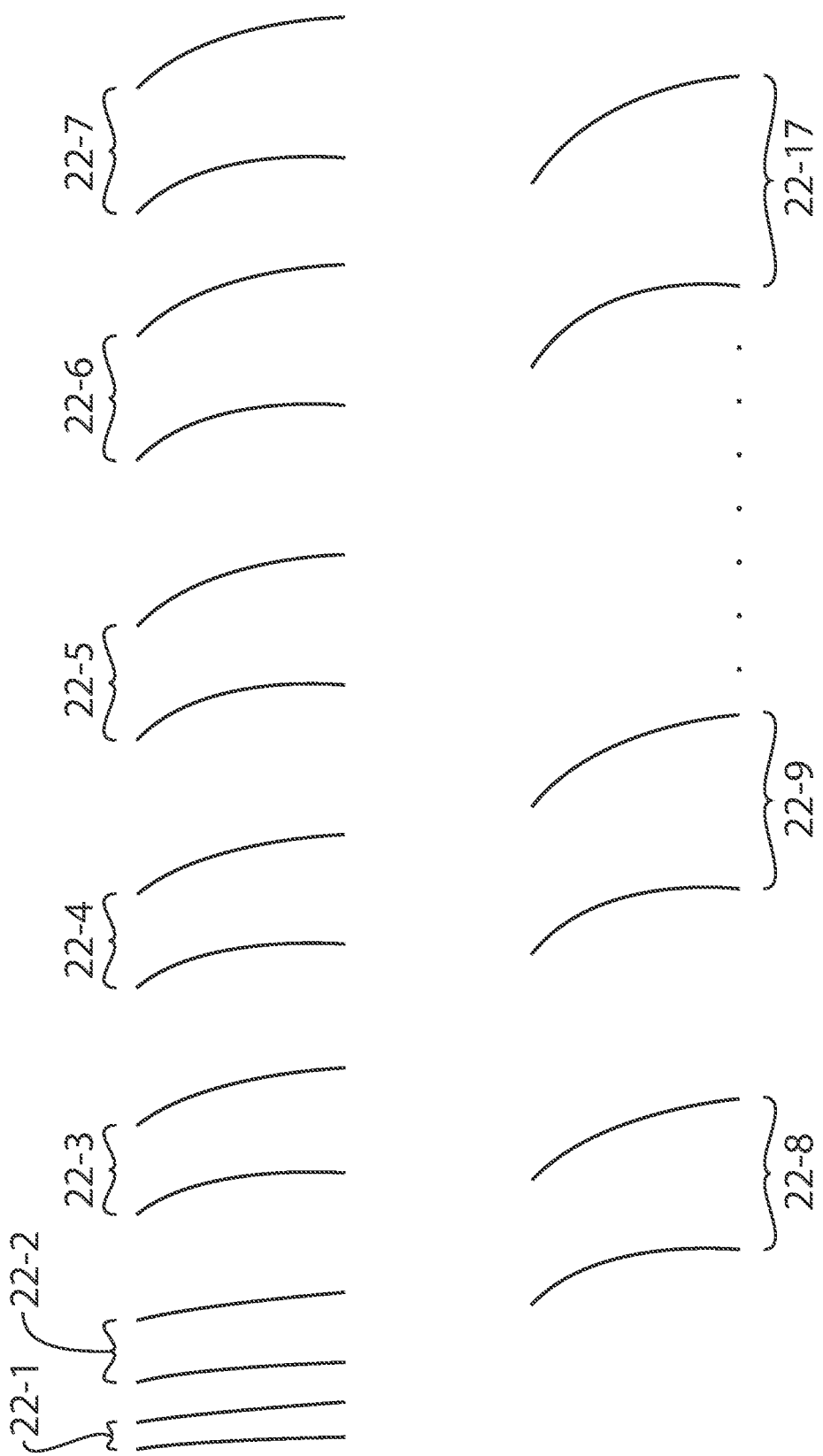
FIG. 4 is an illustration of selected overlays that are stored in a memory that is part of the camera shown in FIG. 1.

Reference is made to FIG. 1, which shows an exploded view of a vehicular camera 10 for a vehicle 11, in accordance with an embodiment of the present invention. In the embodiment shown, the camera 10 is a rearview camera that is configured to assist a vehicle driver when backing the vehicle up. Referring to FIG. 2, the vehicular camera 10 includes an image sensor 12 (e.g., a CCD or a CMOS sensor), a housing 14, a lens 16, and an image processing board 18. The lens 16 transmits and focuses images from behind the vehicle 11 onto the image sensor 12. Referring to FIG. 3, the image processing board 18 communicates with and receives images from the image sensor 12 and transmits the images to other vehicular devices, such as an in-cabin display 19. The images are shown at 20. Referring to FIG. 3, the image processing board 18 includes a memory 21 in which is stored a set of overlays 22-1, 22-2, 22-3, 22-4, 22-5, 22-6, 22-7, 22-8, 22-9 . . . 22-17 (FIG. 4) and a processor 24 (FIG. 3) which selects an overlay to add to the images 20 (FIG. 3) prior to sending the images to the in-cabin display 19.

The overlays 22-1, 22-2, 22-3, 22-4, 22-5, 22-6, 22-7, 22-8, 22-9 . . . 22-17 (FIG. 4) are dynamic overlays in the sense that the processor 24 selects different ones to apply to the image 20 depending on certain criteria. For example, in the example shown, the overlays 22-1, 22-2, 22-3, 22-4, 22-5, 22-6, 22-7, 22-8, 22-9 . . . 22-17 represent predicted vehicle trajectories based on certain data concerning the vehicle 11.

As shown in FIG. 3, the camera 10 receives input data from the vehicle 11 via a bus 28 (e.g., a LIN bus). The input data may include first input data which corresponds to the particular configuration of vehicle 11 the camera 10 is mounted to. For example, a particular vehicle family may include a range of vehicle configurations, covering vehicles with 4 different wheelbases. In this simplified example, other aspects of the vehicle configurations, such as the distance from the camera to the rear axle, are the same for each vehicle. The first input data would indicate to the camera 10 which of the 4 different vehicles the camera 10 is mounted to.

The input data may further include second input data which corresponds to the angle of the steering wheel in the vehicle 11. The steering wheel is shown at 30 in FIG. 1.

The processor 24 uses the first and second input data to identify which overlay 22 to use on the images 20. The processor 24 may achieve this in any suitable way. One such way is by using the first and second input data as input parameters for a lookup table shown at 32 that is stored in the memory 21.

Figure 5:
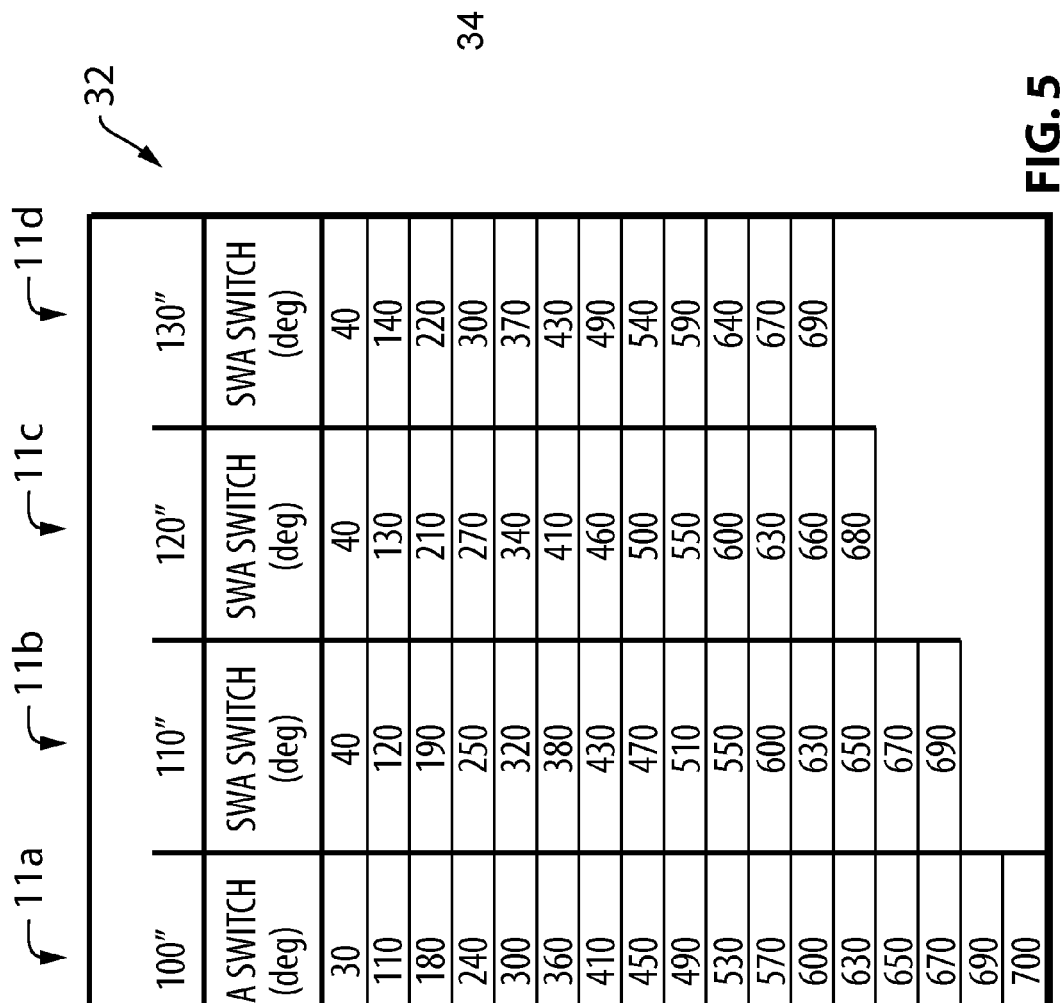
FIG. 5 is a lookup table that is used by the camera to determine which overlay to use on an image.

The lookup table 32 is shown in more detail in FIG. 5. As can be seen, and by way of example only, the aforementioned 4 different vehicle configurations are represented at 11a, 11b, 11c and 11d. A set of steering wheel angles are shown at 34 for each of the vehicle configurations 11a-11d. As can be seen, for vehicle configuration 11a (which has a wheelbase of 100"), if the second input data indicated a steering wheel angle of 240 degrees, the processor 24 would add the overlay shown at 22-4 in FIG. 4, to the image 20 (FIG. 3) prior to transmitting the image 20 with the overlay 22-4 to the in-cabin display 19. As another example, for vehicle configuration 11c (which has a wheelbase of 120"), if the second input data indicated a steering wheel angle of 460 degrees, the processor 24 would add the overlay shown at 22-7 in FIG. 4, to the image 20 (FIG. 3) prior to transmitting the image 20 with the overlay 22-7 to the in-cabin display 19.

It can be seen that the lookup table 32 does not require a substantial amount of the memory 21. Furthermore it can be seen that the total number of overlays 22 that needs to be stored in the memory 21 is no more than would need to be stored for the vehicle configuration 11a. It will be noted that for the 4 vehicle configurations shown in the lookup table 32, 13 of the overlays 22 (i.e., overlays 22-1 to 22-13 are common to all of the vehicle configurations, a further one overlay (22-14) is common to 3 of them, a further 2 overlays (22-15 and 22-16) are common to 2 of them, and only 2 overlays (22-17 and 22-18) are unique to one of them. Accordingly, the amount of memory consumed by providing the capability of handling 4 different vehicle configurations is not substantially more than the amount of memory already provided on such image processing boards when handling a single vehicle configuration. Additionally, the use of a lookup table is not computationally stressful for the processor 24.

However, it is alternatively possible that instead of a lookup table to determine which overlay 22 to use, the processor 24 could use the steering wheel angle data and the vehicle configuration data to calculate the projected vehicle trajectory and to then select an overlay 22 that is suitable. As another alternative, it is possible for the overlays to be mathematically generated by the processor 24 based on the steering wheel angle data and the vehicle configuration data. In other words, the processor 24 could, using the steering wheel angle data and the vehicle configuration data, calculate the curve on which to draw an overlay 22 instead of grabbing a premade overlay 22 from memory. In such an embodiment, the processor 24 could calculate an entirely new overlay each time it samples the steering wheel angle input, or it could calculate an adjustment to make to the previously drawn overlay each time it samples the steering wheel angle input. In either case, the processor 24 would be capable of drawing a continuous range of overlays 22 as compared to embodiments wherein a premade overlay 22 is pulled from memory and used over a range of steering wheel angles. In such an embodiment, the vehicle configuration data can be used to modify the formulas used by the processor 24 to determine the appropriate curve of the overlay 22. These modifications to the formulas (e.g., values for certain constants in the formulas) may be stored in an array or a lookup table stored in memory 21, and which is accessed by the processor 24 based on the vehicle configuration data. The aforementioned lookup table described above is the preferred approach, however.

It will be noted that, in part, many of the overlays 22 are common to the different vehicle configurations because the vehicle configurations are part of the same vehicle family. As such, many of the parameters that would impact the appearance of the overlays would be the same for all members of the vehicle family. Such parameters would include for example, the lateral distance of the camera from the edge of the vehicle, the height of the camera from the ground and the angle of the camera relative to horizontal.

Reference is made to FIG. 6, which shows a variant of the lookup table 32 that will be used to describe an enhancement to the embodiment shown in FIGS. 1-5. In some vehicle families it may be that the vehicle may be fitted with one of two different steering gear mechanisms each with its own gear ratio. The steering gear mechanism is shown in dashed outline at 36 in (FIG. 1). The two alternative steering gear mechanisms that could be used in the vehicle are shown at 36a and 36b in FIG. 6. As can be seen, the vehicle family shown in FIG. 6 includes 5 different vehicle configurations (shown at 11a-11e in FIG. 6), each with its own wheelbase. The first steering gear mechanism 36a can be used on 4 of the configurations. The second steering gear mechanism 36b can be used on 3 of the configurations.

In some cases the particular steering gear mechanism 36 used on the vehicle 11 may not be reflected in the vehicle configuration data (i.e., the first input data) that is transmitted to the camera 10. It will be understood of course that without knowing which steering gear mechanism (more particularly, which gear ratio) is used, the camera 10 does not have enough information based solely on the vehicle configuration and the steering wheel angle to determine the projected vehicle trajectory. In the particular exemplary case shown in FIG. 6, if the vehicle configuration data indicates that the vehicle is of type 11a or 11b, the processor 24 would have sufficient data because those configurations only use steering gear mechanism 36a. Similarly, if the vehicle configuration data indicates that the vehicle is of type 11e, the processor 24 would have sufficient data because those configurations only use steering gear mechanism 36b. However, if the vehicle configuration data indicates that the vehicle is of type 11c or 11d, the processor 24 would not have sufficient data because either steering gear mechanism 36a or 36b could be used with those configurations.

In order to determine which of the two steering gear mechanisms 36a or 36b is used on the vehicle 11, the camera 10 is activated and notified when the steering wheel 30 (FIG. 1) is turned to full lock. The second input data (i.e., the steering wheel angle data) is transmitted to the camera 10, and the processor 24 compares it to the maximum steering wheel angle shown in the lookup table 32 (FIG. 6) for that particular vehicle configuration. For example, for vehicle configuration 11c, if the steering wheel angle data (i.e., the second input data) sent to the camera 10 indicates 680 degrees of rotation, then the processor 24 can determine that the first steering gear mechanism 36a is being used on the vehicle 11. Alternatively, if the steering wheel angle data (i.e., the second input data) sent to the camera 10 indicates 590 degrees of rotation, then the processor 24 can determine that the first steering gear mechanism 36b is being used on the vehicle 11.

While the example overlays shown and described herein relate to the predicted vehicle trajectory, it will be understood that other overlays relating to other vehicle properties could be displayed. Additionally it will be understood that the overlays 22 shown and described may not be the only overlays shown on the images 20. Additionally dynamic and/or static overlays could also be shown on the images by the camera.

The processor 24 and memory 21 have been shown in FIG. 3 to be on an image processing board 18. The image sensor 12 may be attached directly to the board 18. It is alternatively possible for the processor 24 to reside on a separate board (not shown), which is distinct from the board to which the image sensor 12 is attached. In another alternative it is possible for the processor 24 to comprise a processor that is integral with the image sensor 12 and one that is separate from the image sensor 12. In such an alternative, both processors are collectively referred to as processor 24. In yet another alternative, it is possible for the processor 24 to comprise an external processor that is outside the housing 14 of the camera 10 that cooperates with one or more processors that are contained within the housing 14. In such an embodiment, such an external processor may be positioned anywhere within the vehicle.

Similarly, the memory 21 may alternatively reside on a board to which the image sensor 12 is integrally attached, or on a board that is separate from the board to which the image sensor 12 is attached. Alternatively the memory 21 may reside in part on the board to which the image sensor 12 is attached and in part on a board that is separate from the board to which the image sensor 12 is attached, in which case the two portions of the memory would collectively be referred to as the memory 21. In yet another alternative, it is possible for the memory 21 to comprise an external processor that is outside the housing 14 of the camera 10 that cooperates with one or more memories that are contained within the housing 14. In such an embodiment, such an external memory may be positioned anywhere within the vehicle.

While the above description constitutes a plurality of embodiments of the present invention, it will be appreciated that the present invention is susceptible to further modification and change without departing from the fair meaning of the accompanying claims.

The invention claimed is:

1. A vehicular backing up assistance system, the vehicular backing up assistance system comprising:
    a rearview camera mounted at a rear portion of a vehicle equipped with the vehicular backing up assistance system, the equipped vehicle being a vehicle family member of a particular family of pickup trucks;
    wherein the rearview camera comprises a housing that houses an image sensor;
    wherein the particular family of pickup trucks comprises a plurality of vehicle configurations, and wherein the equipped vehicle that the rearview camera is mounted at has a vehicle configuration that is different than other vehicle configurations of the plurality of vehicle configurations of the particular family of pickup trucks;
    wherein the vehicular backing up assistance system receives first input data which corresponds to the vehicle configuration of the equipped vehicle that the rearview camera is mounted at, the first input data being indicative of the vehicle configuration of the equipped vehicle the rearview camera is mounted at;
    an in-cabin display of the equipped vehicle, wherein the in-cabin display is viewable by a driver of the equipped vehicle;
    wherein, with the rearview camera mounted at the rear portion of the equipped vehicle and when the equipped vehicle is backing up, images captured by the rearview camera are displayed at the in-cabin display;
    wherein, with the rearview camera mounted at the rear portion of the equipped vehicle and when the equipped vehicle is backing up, the vehicular backing up assistance system receives second input data corresponding to steering angle of the equipped vehicle;
    wherein, when the equipped vehicle is backing up, the vehicular backing up assistance system displays a predicted trajectory of the equipped vehicle at the in-cabin display as an overlay overlaying the images captured by the rearview camera being displayed at the in-cabin display; and
    wherein the overlay comprises a pair of guidelines that are spaced apart and that are appropriate to (i) the wheelbase of the vehicle configuration of the plurality of vehicle configurations of the particular family of pickup trucks the rearview camera is mounted at and (ii) a current steering angle of the equipped vehicle.

2. The vehicular backing up assistance system of claim 1, wherein the plurality of vehicle configurations comprises four vehicle configurations.

3. The vehicular backing up assistance system of claim 2, wherein the first input data indicates to the vehicular backing up assistance system which of the four vehicle configurations the rearview camera is mounted at.

4. The vehicular backing up assistance system of claim 1, further comprising memory, and wherein the memory stores a plurality of spaced-apart pairs of guidelines.

5. The vehicular backing up assistance system of claim 4, wherein the vehicular backing up assistance system accesses the plurality of spaced-apart pairs of guidelines stored in the memory to select the pair of spaced-apart guidelines appropriate to (i) the wheelbase of the vehicle configuration of the equipped vehicle the rearview camera is mounted at and (ii) the current steering angle of the equipped vehicle.

6. The vehicular backing up assistance system of claim 5, wherein the plurality of spaced-apart pairs of guidelines stored in the memory forms a look-up table.

7. The vehicular backing up assistance system of claim 4, wherein the housing of the rearview camera houses the memory.

8. The vehicular backing up assistance system of claim 7, wherein the plurality of spaced-apart pairs of guidelines stored in the memory includes a set of spaced-apart pairs of guidelines corresponding to the vehicle configuration of the equipped vehicle the rearview camera is mounted at and includes other sets of spaced-apart pairs of guidelines corresponding to other vehicle configurations of the plurality of vehicle configurations of the particular family of pickup trucks.

9. The vehicular backing up assistance system of claim 1, wherein the vehicular backing up assistance system comprises a processor, and wherein, with the rearview camera mounted at the rear portion of the equipped vehicle, the processor receives the first input data corresponding to the vehicle configuration of the equipped vehicle the rearview camera is mounted at, and wherein, when the equipped vehicle is backing up, the processor receives the second input data corresponding to steering angle of the equipped vehicle.

10. The vehicular backing up assistance system of claim 9, wherein the rearview camera houses (i) the processor and (ii) memory.

11. The vehicular backing up assistance system of claim 10, wherein the memory stores a plurality of spaced-apart pairs of guidelines.

12. The vehicular backing up assistance system of claim 11, wherein the vehicular backing up assistance system accesses the plurality of spaced-apart pairs of guidelines stored in the memory to select the pair of spaced-apart guidelines appropriate to (i) the wheelbase of the vehicle configuration of the equipped vehicle the rearview camera is mounted at and (ii) the current steering angle of the equipped vehicle.

13. The vehicular backing up assistance system of claim 1, wherein the vehicular backing up assistance system receives the first input data via a bus communication carried over a vehicular communication bus of the equipped vehicle.

14. The vehicular backing up assistance system of claim 13, wherein the vehicular backing up assistance system receives, via a bus communication carried over the vehicular communication bus, the second input data corresponding to steering angle of the equipped vehicle when the equipped vehicle is backing up.

15. The vehicular backing up assistance system of claim 1, wherein, when the equipped vehicle is backing up and based on the received first input data and the received second input data, the vehicular backing up assistance system calculates the predicted vehicle trajectory using a mathematical formula.

16. The vehicular backing up assistance system of claim 1, wherein, when the equipped vehicle is backing up, the predicted vehicle trajectory is displayed at the in-cabin display as a continuous range of overlays as steering angle of the equipped vehicle changes.

17. The vehicular backing up assistance system of claim 1, wherein at least one vehicle configuration of the plurality of vehicle configurations of the particular family of pickup trucks comprises a regular cab vehicle configuration.

18. The vehicular backing up assistance system of claim 1, wherein at least one vehicle configuration of the plurality of vehicle configurations of the particular family of pickup trucks comprises an extended cab vehicle configuration.

19. The vehicular backing up assistance system of claim 1, wherein at least one vehicle configuration of the plurality of vehicle configurations of the particular family of pickup trucks comprises a short bed vehicle configuration.

20. The vehicular backing up assistance system of claim 1, wherein at least one vehicle configuration of the plurality of vehicle configurations of the particular family of pickup trucks comprises a long bed vehicle configuration.

21. The vehicular backing up assistance system of claim 1, wherein one vehicle configuration of the plurality of vehicle configurations of the particular family of pickup trucks comprises a short bed regular cab vehicle configuration, and wherein another vehicle configuration of the plurality of vehicle configurations of the particular family of pickup trucks comprises a long bed regular cab vehicle configuration.

22. The vehicular backing up assistance system of claim 21, wherein another vehicle configuration of the plurality of vehicle configurations of the particular family of pickup trucks comprises a short bed extended cab vehicle configuration, and wherein another vehicle configuration of the plurality of vehicle configurations of the particular family of pickup trucks comprises a long bed extended cab vehicle configuration.

23. The vehicular backing up assistance system of claim 1, wherein the plurality of vehicle configurations of the particular family of pickup trucks comprises (i) a short bed regular cab vehicle configuration, (ii) a long bed regular cab vehicle configuration, (iii) a short bed extended cab vehicle configuration and (iv) a long bed extended cab vehicle configuration.

24. The vehicular backing up assistance system of claim 1, wherein the vehicle configuration of the equipped vehicle has a wheelbase of at least 100 inches.

25. The vehicular backing up assistance system of claim 24, wherein the overlay comprises a dynamic overlay, and wherein curvature of the displayed spaced-apart pair of guidelines changes with change in steering angle of the equipped vehicle when the equipped vehicle is backing up.

26. The vehicular backing up assistance system of claim 24, wherein the overlay comprises a static overlay.

27. The vehicular backing up assistance system of claim 1, wherein the vehicle configuration of the equipped vehicle has a wheelbase of at least 110 inches.

28. The vehicular backing up assistance system of claim 1, wherein the vehicle configuration of the equipped vehicle has a wheelbase of at least 120 inches.

29. The vehicular backing up assistance system of claim 1, wherein the vehicle configuration of the equipped vehicle has a wheelbase of at least 130 inches.

30. The vehicular backing up assistance system of claim 1, wherein the vehicle configuration of the equipped vehicle has a wheelbase of at least 140 inches.

31. The vehicular backing up assistance system of claim 1, wherein the plurality of vehicle configurations of the particular family of pickup trucks comprises vehicle configurations having a plurality of steering wheel ratios.

32. The vehicular backing up assistance system of claim 1, wherein the vehicular backing up assistance system receives a third input corresponding to a steering wheel ratio of the equipped vehicle.

33. The vehicular backing up assistance system of claim 32, wherein the steering wheel ratio of the equipped vehicle is determined when steering of the equipped vehicle is at full lock.

34. The vehicular backing up assistance system of claim 1, wherein the rearview camera is configured for mounting to any vehicle configuration of the plurality of vehicle configurations of the particular family of pickup trucks.

35. The vehicular backing up assistance system of claim 1, wherein the vehicular backing up assistance system comprises a processor, and wherein the processor is disposed at a circuit board.

36. The vehicular backing up assistance system of claim 35, wherein the vehicular backing up assistance system comprises memory storing a plurality of spaced-apart pairs of guidelines, and wherein the memory storing the plurality of spaced-apart pairs of guidelines is disposed at the circuit board.

37. The vehicular backing up assistance system of claim 36, wherein the vehicular backing up assistance system accesses the plurality of spaced-apart pairs of guidelines stored in the memory to select the pair of spaced-apart guidelines appropriate to (i) the wheelbase of the vehicle configuration of the equipped vehicle the rearview camera is mounted at and (ii) the current steering angle of the equipped vehicle.

38. The vehicular backing up assistance system of claim 37, wherein the plurality of spaced-apart pairs of guidelines stored in the memory includes a set of spaced-apart pairs of guidelines corresponding to the vehicle configuration of the equipped vehicle the rearview camera is mounted at and includes other sets of spaced-apart pairs of guidelines corresponding to other vehicle configurations of the plurality of vehicle configurations of the particular family of pickup trucks.

39. The vehicular backing up assistance system of claim 38, wherein the circuit board is housed by the rearview camera.

40. A vehicular backing up assistance system, the vehicular backing up assistance system comprising:
- a rearview camera mounted at a rear portion of a vehicle equipped with the vehicular backing up assistance system, the equipped vehicle being a vehicle family member of a particular family of pickup trucks;
- wherein the rearview camera comprises a housing that houses an image sensor;
- wherein the particular family of pickup trucks comprises a plurality of vehicle configurations, and wherein the equipped vehicle that the rearview camera is mounted at has a vehicle configuration that is different than other vehicle configurations of the plurality of vehicle configurations of the particular family of pickup trucks;
- wherein the vehicular backing up assistance system receives first input data which corresponds to the vehicle configuration of the equipped vehicle that the rearview camera is mounted at, the first input data being indicative of the vehicle configuration of the equipped vehicle the rearview camera is mounted at;
- an in-cabin display of the equipped vehicle, wherein the in-cabin display is viewable by a driver of the equipped vehicle;
- wherein, with the rearview camera mounted at the rear portion of the equipped vehicle and when the equipped vehicle is backing, images captured by the rearview camera are displayed at the in-cabin display;
- wherein, with the rearview camera mounted at the rear portion of the equipped vehicle and when the equipped vehicle is backing up, the vehicular backing up assistance system receives second input data corresponding to steering angle of the equipped vehicle;
- wherein, when the equipped vehicle is backing up, the vehicular backing up assistance system displays a predicted trajectory of the equipped vehicle at the in-cabin display as an overlay overlaying the images captured by the rearview camera being displayed at the in-cabin display;
- wherein the overlay comprises a pair of guidelines that are spaced apart and that are appropriate to (i) the wheelbase of the vehicle configuration of the plurality of vehicle configurations of the particular family of pickup trucks the rearview camera is mounted at and (ii) a current steering angle of the equipped vehicle; and
- wherein the overlay comprises a dynamic overlay, and wherein curvature of the displayed spaced-apart pair of guidelines changes with change in steering angle of the equipped vehicle when the equipped vehicle is backing up.

41. The vehicular backing up assistance system of claim 40, wherein the vehicular backing up assistance system comprises a processor, and wherein, with the rearview camera mounted at the rear portion of the equipped vehicle, the processor receives the first input data corresponding to the vehicle configuration of the equipped vehicle the rearview camera is mounted at, and wherein, when the equipped vehicle is backing up, the processor receives the second input data corresponding to steering angle of the equipped vehicle.

42. The vehicular backing up assistance system of claim 41, wherein the processor receives the first input data via a bus communication carried over a vehicular communication bus of the equipped vehicle.

43. The vehicular backing up assistance system of claim 42, wherein the processor receives, via a bus communication carried over the vehicular communication bus, the second input data corresponding to steering angle of the equipped vehicle when the equipped vehicle is backing up.

44. The vehicular backing up assistance system of claim 43, wherein the processor is housed by the rearview camera.

45. The vehicular backing up assistance system of claim 42, wherein the vehicular backing up assistance system comprises memory, and wherein the memory stores a plurality of spaced-apart pairs of guidelines, and wherein the vehicular backing up assistance system accesses the plurality of spaced-apart pairs of guidelines stored in the memory to select the pair of spaced-apart guidelines appropriate to (i) the wheelbase of the vehicle configuration of the equipped vehicle the rearview camera is mounted at and (ii) the current steering angle of the equipped vehicle.

46. The vehicular backing up assistance system of claim 45, wherein the plurality of spaced-apart pairs of guidelines stored in the memory forms a look-up table.

47. The vehicular backing up assistance system of claim 45, wherein the memory is housed by the rearview camera.

48. The vehicular backing up assistance system of claim 47, wherein the processor is housed by the rearview camera.

49. The vehicular backing up assistance system of claim 45, wherein the processor is disposed at a circuit board, and wherein the memory is disposed at the circuit board, and wherein the circuit board is housed by the rearview camera.

50. The vehicular backing up assistance system of claim 41, wherein the plurality of vehicle configurations of the particular family of pickup trucks comprises (i) a short bed regular cab vehicle configuration, (ii) a long bed regular cab vehicle configuration, (iii) a short bed extended cab vehicle configuration and (iv) a long bed extended cab vehicle configuration.

51. The vehicular backing up assistance system of claim 50, wherein the vehicle configuration of the equipped vehicle has a wheelbase of at least 100 inches.

52. The vehicular backing up assistance system of claim 50, wherein the vehicle configuration of the equipped vehicle has a wheelbase of at least 110 inches.

53. The vehicular backing up assistance system of claim 50, wherein the vehicle configuration of the equipped vehicle has a wheelbase of at least 120 inches.

54. The vehicular backing up assistance system of claim 50, wherein the vehicle configuration of the equipped vehicle has a wheelbase of at least 130 inches.

55. The vehicular backing up assistance system of claim 50, wherein the vehicle configuration of the equipped vehicle has a wheelbase of at least 140 inches.

56. The vehicular backing up assistance system of claim 41, wherein, when the equipped vehicle is backing up and based on the received first input data and the received second input data, the vehicular backing up assistance system calculates the predicted vehicle trajectory using a mathematical formula.

57. The vehicular backing up assistance system of claim 41, wherein the processor is disposed at a circuit board.

58. The vehicular backing up assistance system of claim 57, wherein the circuit board is housed by the rearview camera.

59. The vehicular backing up assistance system of claim 40, wherein, when the equipped vehicle is backing up, the predicted vehicle trajectory is displayed at the in-cabin display as a continuous range of overlays as steering angle of the equipped vehicle changes.

60. The vehicular backing up assistance system of claim 40, wherein the plurality of vehicle configurations comprises four vehicle configurations, and wherein the first input data indicates to the vehicular backing up assistance system which of the four vehicle configurations the rearview camera is mounted at.

61. The vehicular backing up assistance system of claim 60, wherein the four vehicle configurations are (i) a short bed regular cab vehicle configuration, (ii) a long bed regular cab vehicle configuration, (iii) a short bed extended cab vehicle configuration and (iv) a long bed extended cab vehicle configuration.

62. The vehicular backing up assistance system of claim 61, wherein the plurality of vehicle configurations of the particular family of pickup trucks comprises vehicle configurations having a plurality of steering wheel ratios.

63. The vehicular backing up assistance system of claim 61, wherein the vehicular backing up assistance system receives a third input corresponding to a steering wheel ratio of the equipped vehicle.

64. The vehicular backing up assistance system of claim 63, wherein the steering wheel ratio of the equipped vehicle is determined when steering of the equipped vehicle is at full lock.

65. The vehicular backing up assistance system of claim 61, wherein the rearview camera is configured for mounting to any vehicle configuration of the plurality of vehicle configurations of the particular family of pickup trucks.

66. A vehicular backing up assistance system, the vehicular backing up assistance system comprising:
a rearview camera mounted at a rear portion of a vehicle equipped with the vehicular backing up assistance system, the equipped vehicle being a vehicle family member of a particular family of pickup trucks;
wherein the particular family of pickup trucks comprises a plurality of vehicle configurations, and wherein the equipped vehicle that the rearview camera is mounted at has a vehicle configuration that is different than other vehicle configurations of the plurality of vehicle configurations of the particular family of pickup trucks;
wherein the vehicular backing up assistance system receives first input data which corresponds to the vehicle configuration of the equipped vehicle that the rearview camera is mounted at, the first input data being indicative of the vehicle configuration of the equipped vehicle the rearview camera is mounted at;
an in-cabin display of the equipped vehicle, wherein the in-cabin display is viewable by a driver of the equipped vehicle;
wherein, with the rearview camera mounted at the rear portion of the equipped vehicle and when the equipped vehicle is backing up, images captured by the rearview camera are displayed at the in-cabin display;
wherein, with the rearview camera mounted at the rear portion of the equipped vehicle and when the equipped vehicle is backing up, the vehicular backing up assistance system receives second input data corresponding to steering angle of the equipped vehicle;
wherein, when the equipped vehicle is backing up, the vehicular backing up assistance system displays a predicted trajectory of the equipped vehicle at the in-cabin display as an overlay overlaying the images captured by the rearview camera being displayed at the in-cabin display;
wherein the overlay comprises a pair of guidelines that are spaced apart and that are appropriate to (i) the wheelbase of the vehicle configuration of the plurality of vehicle configurations of the particular family of pickup trucks the rearview camera is mounted at and (ii) a current steering angle of the equipped vehicle;
wherein the rearview camera comprises a housing that houses an image sensor disposed on a circuit board;
a processor disposed on a circuit board that is separate from the circuit board on which the image sensor is disposed;
wherein the circuit board on which the processor is disposed is positioned within the equipped vehicle separate from and outside of the housing of the rearview camera;
wherein the processor receives the first input data corresponding to the vehicle configuration of the equipped vehicle the rearview camera is mounted at; and
wherein, when the equipped vehicle is backing up, the processor receives the second input data corresponding to steering angle of the equipped vehicle.

67. The vehicular backing up assistance system of claim 66, wherein the processor receives the first input data via a bus communication carried over a vehicular communication bus of the equipped vehicle.

68. The vehicular backing up assistance system of claim 67, wherein the processor receives, via a bus communication carried over the vehicular communication bus, the second input data corresponding to steering angle of the equipped vehicle when the equipped vehicle is backing up.

69. The vehicular backing up assistance system of claim 68, wherein the plurality of vehicle configurations of the particular family of pickup trucks comprises (i) a short bed regular cab vehicle configuration, (ii) a long bed regular cab vehicle configuration, (iii) a short bed extended cab vehicle configuration and (iv) a long bed extended cab vehicle configuration.

70. The vehicular backing up assistance system of claim 68, wherein the overlay comprises a dynamic overlay, and wherein curvature of the displayed spaced-apart pair of guidelines changes with change in steering angle of the equipped vehicle when the equipped vehicle is backing up.

71. The vehicular backing up assistance system of claim 66, wherein the vehicle configuration of the equipped vehicle has a wheelbase of at least 100 inches.

72. The vehicular backing up assistance system of claim 66, wherein the vehicle configuration of the equipped vehicle has a wheelbase of at least 110 inches.

73. The vehicular backing up assistance system of claim 66, wherein the vehicle configuration of the equipped vehicle has a wheelbase of at least 120 inches.

74. The vehicular backing up assistance system of claim 66, wherein the vehicle configuration of the equipped vehicle has a wheelbase of at least 130 inches.

75. The vehicular backing up assistance system of claim 66, wherein the vehicle configuration of the equipped vehicle has a wheelbase of at least 140 inches.

76. The vehicular backing up assistance system of claim 66, wherein the vehicular backing up assistance system comprises memory positioned within the equipped vehicle separate from and outside of the housing of the rearview camera.

77. The vehicular backing up assistance system of claim 76, wherein the memory is disposed on the circuit board that the processor is disposed on.

78. The vehicular backing up assistance system of claim 77, wherein the memory stores a plurality of spaced-apart pairs of guidelines, and wherein the vehicular backing up assistance system accesses the plurality of spaced-apart pairs of guidelines stored in the memory to select the pair of spaced-apart guidelines appropriate to (i) the wheelbase of the vehicle configuration of the equipped vehicle the rearview camera is mounted at and (ii) the current steering angle of the equipped vehicle.

79. The vehicular backing up assistance system of claim 78, wherein the plurality of spaced-apart pairs of guidelines stored in the memory forms a look-up table.

80. The vehicular backing up assistance system of claim 78, wherein the plurality of spaced-apart pairs of guidelines stored in the memory includes a set of spaced-apart pairs of guidelines corresponding to the vehicle configuration of the equipped vehicle the rearview camera is mounted at and includes other sets of spaced-apart pairs of guidelines corresponding to other vehicle configurations of the plurality of vehicle configurations of the particular family of pickup trucks.

81. The vehicular backing up assistance system of claim 66, wherein, when the equipped vehicle is backing up and based on the received first input data and the received second input data, the vehicular backing up assistance system calculates the predicted vehicle trajectory using a mathematical formula.

82. The vehicular backing up assistance system of claim 66, wherein, when the equipped vehicle is backing up, the predicted vehicle trajectory is displayed at the in-cabin display as a continuous range of overlays as steering angle of the equipped vehicle changes.

83. The vehicular backing up assistance system of claim 66, wherein the plurality of vehicle configurations comprises four vehicle configurations, and wherein the first input data indicates to the processor which of the four vehicle configurations the rearview camera is mounted at.

84. The vehicular backing up assistance system of claim 66, wherein the plurality of vehicle configurations of the particular family of pickup trucks comprises vehicle configurations having a plurality of steering wheel ratios.

85. The vehicular backing up assistance system of claim 66, wherein the vehicular backing up assistance system receives a third input corresponding to a steering wheel ratio of the equipped vehicle.

86. The vehicular backing up assistance system of claim 85, wherein the steering wheel ratio of the equipped vehicle is determined when steering of the equipped vehicle is at full lock.

87. The vehicular backing up assistance system of claim 66, wherein the rearview camera is configured for mounting to any vehicle configuration of the plurality of vehicle configurations of the particular family of pickup trucks.

88. The vehicular backing up assistance system of claim 66, wherein the overlay comprises a static overlay.

* * * * *